(12) United States Patent
Mainaud

(10) Patent No.: US 9,007,923 B2
(45) Date of Patent: Apr. 14, 2015

(54) QUICK ADVERTISEMENT OF A FAILURE OF A NETWORK CELLULAR ROUTER

(75) Inventor: Bastien Mainaud, Ris-Orangis (FR)

(73) Assignee: Itron, Inc., Liberty Lake, WA (US)

( * ) Notice: Subject to any disclaimer, the term of this patent is extended or adjusted under 35 U.S.C. 154(b) by 108 days.

(21) Appl. No.: 13/365,142

(22) Filed: Feb. 2, 2012

(65) Prior Publication Data

US 2013/0107724 A1    May 2, 2013

Related U.S. Application Data

(63) Continuation of application No. PCT/US2012/023116, filed on Jan. 30, 2012.

(30) Foreign Application Priority Data

Oct. 31, 2011 (EP) .................................. 11187338

(51) Int. Cl.
*H04J 1/16* (2006.01)
*H04W 40/24* (2009.01)
*H04L 12/24* (2006.01)
*H04W 24/04* (2009.01)

(52) U.S. Cl.
CPC ......... *H04W 40/246* (2013.01); *H04L 41/0668* (2013.01); *H04L 41/12* (2013.01); *H04W 24/04* (2013.01)

(58) Field of Classification Search
CPC ........................................................ H04J 3/14
USPC ........................................................ 370/244
See application file for complete search history.

(56) References Cited

U.S. PATENT DOCUMENTS

| | | | |
|---|---|---|---|
| 6,940,821 B1* | 9/2005 | Wei et al. | 370/244 |
| 7,535,825 B1* | 5/2009 | Callon | 370/216 |
| 7,668,082 B1* | 2/2010 | Callon | 370/218 |
| 2002/0049933 A1* | 4/2002 | Nyu | 714/43 |
| 2002/0131362 A1* | 9/2002 | Callon | 370/216 |
| 2003/0031126 A1* | 2/2003 | Mayweather et al. | 370/223 |
| 2004/0008619 A1* | 1/2004 | Doshi et al. | 370/217 |
| 2004/0218582 A1* | 11/2004 | Kennedy et al. | 370/351 |
| 2006/0062199 A1* | 3/2006 | Yoshizawa | 370/351 |

(Continued)

FOREIGN PATENT DOCUMENTS

| | | | |
|---|---|---|---|
| EP | 1492279 | 12/2004 | |
| EP | 1492279 A1 * | 12/2004 | H04L 12/56 |

OTHER PUBLICATIONS

PCT Search Report mailed Oct. 31, 2012 for PCT application No. PCT/US12/23116, 9 pages.

(Continued)

*Primary Examiner* — Chirag Shah
*Assistant Examiner* — Jael Ulysse
(74) *Attorney, Agent, or Firm* — Lee & Hayes, PLLC

(57) ABSTRACT

Techniques for quick advertisement of a failure of a cellular router in a network are described herein. In one example, problems with the cellular router in the network are recognized, such as by the cellular router itself, or by a node in communication with the cellular router. In response, one or more cellular router failure notification packets are sent by the cellular router prior to failure to one or more nodes within a cell served by the failing cellular router. The cellular router failure notification packets indicate that the cellular router is failing, thereby starting a discovery process in each node, wherein an attempt is made to discover a new cellular router.

18 Claims, 5 Drawing Sheets

(56) References Cited

U.S. PATENT DOCUMENTS

| | | | |
|---|---|---|---|
| 2006/0209787 A1* | 9/2006 | Okuda | 370/351 |
| 2008/0049628 A1* | 2/2008 | Bugenhagen | 370/244 |
| 2008/0089390 A1 | 4/2008 | Picard | |
| 2009/0092054 A1* | 4/2009 | Compton et al. | 370/242 |
| 2009/0161530 A1* | 6/2009 | Yang et al. | 370/216 |
| 2009/0278708 A1 | 11/2009 | Kelley et al. | |
| 2010/0008218 A1* | 1/2010 | Dumov et al. | 370/216 |
| 2010/0251046 A1* | 9/2010 | Mizuno et al. | 714/726 |
| 2011/0013605 A1* | 1/2011 | Moeller | 370/338 |
| 2012/0002605 A1* | 1/2012 | Yoshino et al. | 370/328 |

OTHER PUBLICATIONS

Freaklabs—Open Source Wireless, IEEE 802.15.4 in the context of Zigbee—Part 2, Dec. 14, 2008, 8 pages.

Wireless Medium Access Control, IEEE 802.15.4, Speaker Chun-Yi Chen, Sep. 7, 2007, 40 pages.

Extended European Search Report mailed May 3, 2012 for European patent application No. 11187338.6, 7 pages.

European Office Action mailed Dec. 11, 2013 for European patent application No. 11187338.6, a counterpart foreign application of U.S. Appl. No. 13/365,142, 7 pages.

* cited by examiner

QUICK ADVERTISEMENT OF A FAILURE OF A NETWORK CELLULAR ROUTER

RELATED APPLICATIONS

This application is a continuation of, and claims priority to, PCT International Application No. PCT/US 12/23116, filed Jan. 30, 2012, which claims foreign priority to European Application No. 11187338.6, filed on Oct. 31, 2011, both of which are incorporated herein by reference.

BACKGROUND

A mesh network can include a plurality of nodes, wherein each node is in communication within at least one other node. Information may be transferred from node to node, and ultimately to a cellular router, from which it is transmitted to the Internet, a server or other location.

If the cellular router fails, a number of nodes within a cell (i.e., an "autonomous routing area" or other region) associated with the cellular router may not immediately become aware of the failure. Accordingly, the nodes may not begin to look for a new cell and a new cellular router immediately upon failure of the cellular router in their cell. Moreover, during this time the nodes will be unreachable by many entities. And further, any data the nodes transmit will be directed toward a failed cellular router.

Prior solutions to this problem have involved counters that are periodically incremented, thereby indicating continued presence of the cellular router. Failure to increment, over a sufficient period of time, indicates cellular router failure and the need for nodes to go into a "discovery mode," in which they will look for a new cell with which to associate.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

The disclosure describes techniques for quick advertisement indicating a problem with, or failure of, a network cellular router. The advertisement may be sent to nodes in a cell of the cellular router. In one example, problems with a cellular router in a network are recognized. The problems may be recognized by the cellular router itself and/or by a node in communication with the cellular router. In response, one or more cellular router failure notification packets are sent, announcing the failure. The packets may be sent by the cellular router prior to failure and/or by one or more nodes within a cell served by the failing cellular router. Packets sent by the cellular router may indicate a problem with the cellular router. Packets sent by nodes served by the failing cellular router may report a problem with the cellular router or the failure of the cellular router. The packets may be transmitted using a randomization function, to reduce collisions between the packets. The cellular router failure notification packets may start a discovery process in each node, wherein an attempt is made to discover a new cellular router.

The discussion herein includes several sections. Each section is intended to be non-limiting. More particularly, the description is intended to illustrate components and/or techniques which may be utilized in advertising a problem and/or failure of a cellular router in a network and in associating nodes with a new cell and cellular router, but not components and/or techniques which are necessarily required. The discussion begins with a section entitled "Cellular Router Failure and Recovery," which describes one environment that may implement the techniques described herein, and which shows operation of the components and techniques discussed herein. Next, a section entitled "Example Network Device" illustrates and describes aspects of a generic network device, including a node, a cellular router or other network device. Further sections, entitled "Example Processes" and "Example Cellular Router Failure Advertisement" illustrate and describe techniques that may be used to advertise a problem and/or failure of a cellular router in a network and to associate nodes with a new cellular router. Finally, the discussion ends with a brief conclusion.

This brief introduction, including section titles and corresponding summaries, is provided for the reader's convenience and is not intended to describe and/or limit the scope of the claims or any section of this disclosure.

Example Cellular Router Failure and Recovery

Figure 1:
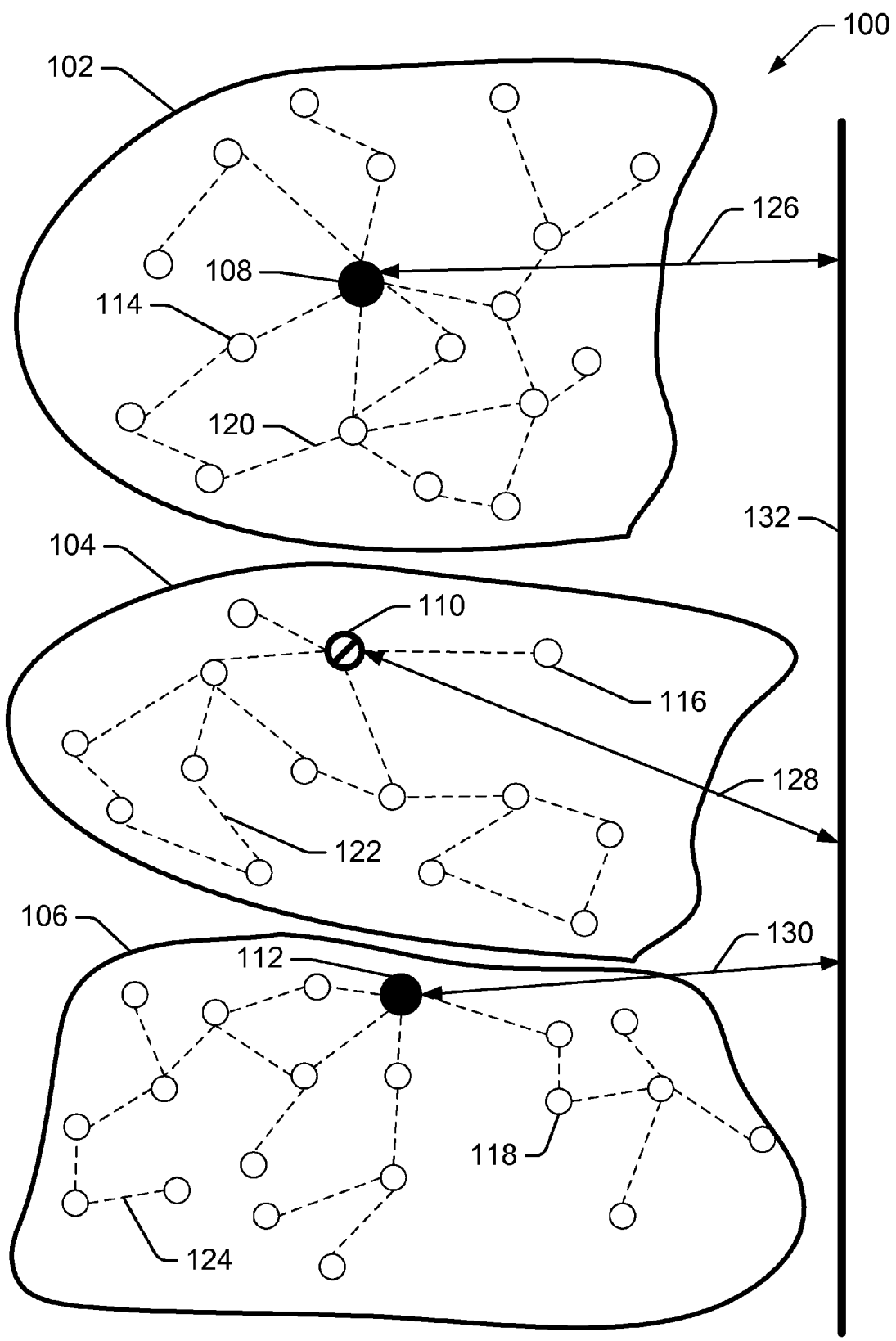
FIG. 1 is a diagram showing a network having three cells, each served by a cellular router.

FIG. 1 is a diagram showing a network 100 having three cells 102, 104, and 106 and a plurality of network devices. In the context herein, a network device can be a cellular router, a node, or other device in communication with the network. In the example of FIG. 1, each cell 102-106 is served by a cellular router 108, 110, and 112, respectively. Within each cell 102-106 is a plurality of nodes, e.g., nodes 114, 116, and 118. The nodes within the cells 102-106 may be configured as a mesh network. Accordingly, each node 114-118 may communicate with at least one other node by means of radio frequency (RF) links 120, 122, and 124. The cellular routers 108-112 may communicate over one or more cellular networks 126, 128, and 130, to reach the Internet 132, a server or central office, or network suitable for data transmission.

In the example of FIG. 1, cellular router 110 is experiencing a problem and/or failure. However, because the cellular routers 108-112 and the nodes within cells 102-106 are configured with components and/or techniques which may be utilized in advertising the problem and/or failure, the nodes are able to associate into new cell(s) with new cellular router(s).

Figure 2:
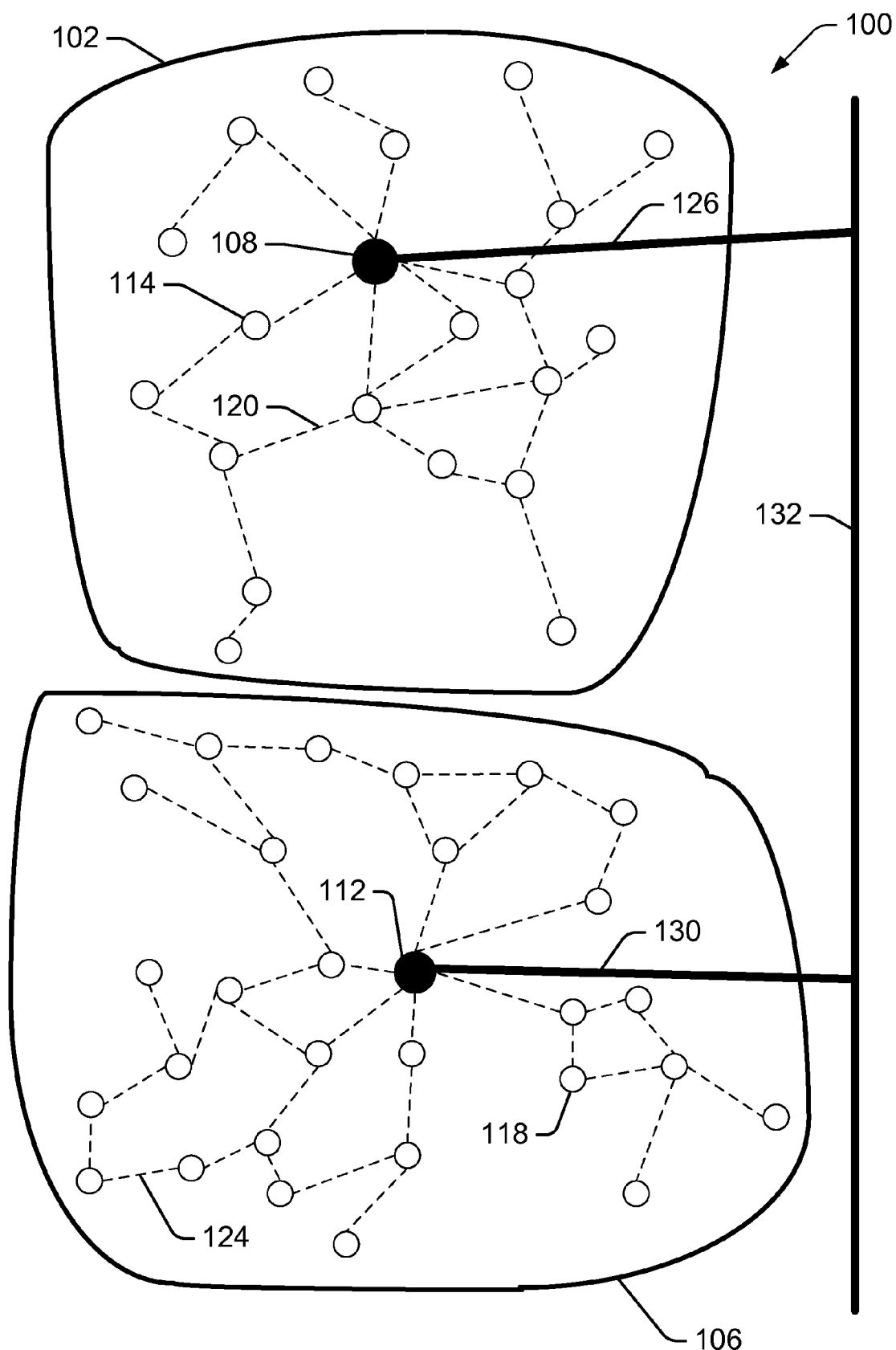
FIG. 2 is a diagram of the network of FIG. 1, wherein one of the three cellular routers has failed, and techniques have been employed to reconfigure the three original cells into two functioning cells.

FIG. 2 is a diagram of the network 100 of FIG. 1, showing its configuration after the cellular router 110 (as seen in FIG. 1) has encountered problems and/or failed. The nodes within cell 104 (as seen in FIG. 1) have therefore sought out, and found, new cell(s) and cellular router(s). In this reorganization of the network, an example of the components and/or techniques characteristic of quick advertisement of failure of a network cellular router is illustrated. Thus, in the example collectively illustrated by FIGS. 1 and 2, one or more network devices have recognized a problem or failure of the cellular router 110. In response, the one or more network devices have advertised the problem and/or failure of the cellular router 110 (seen in FIG. 1) to nodes within the cell 104 (seen in FIG. 1). The advertising may be performed by the cellular router itself, if it is able to recognize its own problem. Alternatively and/or additionally, the advertising may be performed by node(s) or other network device(s) that recognized or were informed of the problem and/or failure of the cellular router 110. In performing the advertising, cellular router failure notification packet(s) are configured to notify network devices of the past or pending failure or problem of the cellular router. The cellular router failure notification packet(s) are then transmitted widely within the cell 104 (as seen in FIG. 1) to nodes within the cell served by the failed cellular router. The transmission of packets may be according to a randomized function, to reduce collisions of the packets.

Example Network Device

Figure 3:
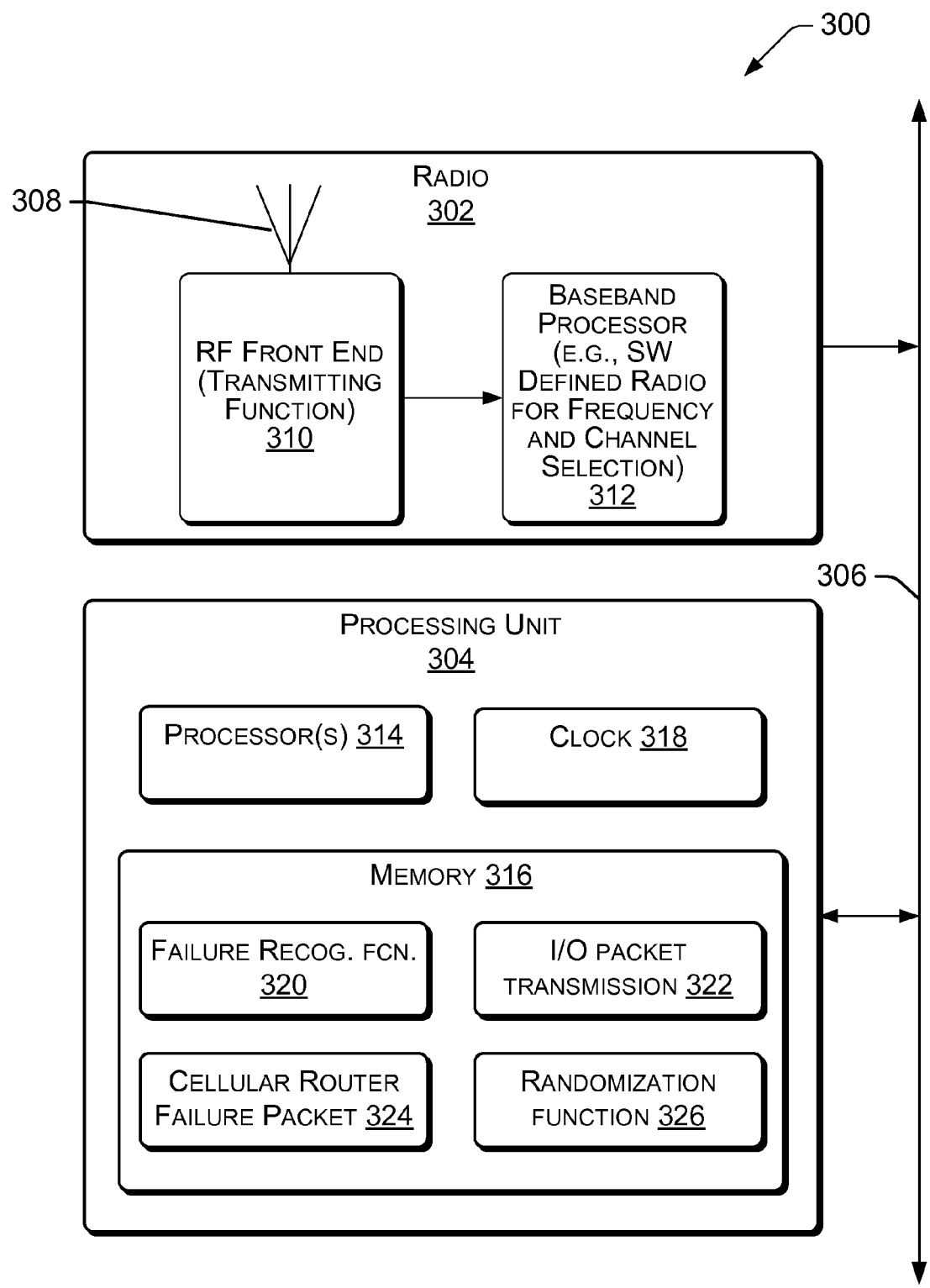
FIG. 3 is a diagram of a network device, and generically represents a node, a cellular router or other network device.

FIG. 3 a diagram showing an example of a network work device 300. Examples of network devices include a cellular router (e.g., cellular router 108-112 of FIG. 1) or a node (e.g., nodes 114-118 of FIG. 1). Nodes 114-118 are representative of any network device, including meters (e.g., electric, gas and water consumption meters for homes, businesses and organizations), transformers, control boxes, servers, sensors, generators, substations, switches, valves, pumping stations, etc.

The example network device 300 of FIG. 3 includes a radio 302 and a processing unit 304 in communication over a bus 306. In one example, the radio 302 includes an antenna 308 providing input to a radio frequency (RF) front end 310. The RF front end 310 may provide transmitting and receiving functions. The RF front end 310 may include high-frequency analog and/or hardware components that provide functionality such tuning and attenuating signals provided by the antenna 308 and obtained from nodes within the network. As output, the RF front end 310 may provide data that is generally in the form of an analog or digitized baseband signal sent to a baseband processor 312. A particular case, not to be construed as a typical and/or limiting case, the output of the RF front end 310 may include a stream of one's and zero's representing data and/or packet(s).

All or part of the baseband processor 312 may be configured as a software (SW) defined radio. In one example, the baseband processor 312 provides frequency and/or channel selection functionality to the radio 302. The software-defined radio may include components that might alternatively be implemented using analog components. For example, the SW defined radio may include mixers, filters, amplifiers, modulators and/or demodulators, detectors, etc., implemented in software executed by a processor or application specific integrated circuit (ASIC) or other embedded computing device(s). The software-defined radio may utilize processor 314 and software defined or stored in memory 316. Accordingly, a balance may be made between functionality performed by the RF front end 310 and functionality performed by the baseband processor 312, which may include a software defined radio.

The processing unit 304 may include one or more processors 314 in communication with one or more memory devices 316. A clock 318 may be configured to maintain some time information, possibly including the time of day and the date. The clock may also be configured to provide one or more count-up or count-down timers. Such timers may be used to time periods of time used by the randomization function, system timers and/or the like.

A failure recognition function 320 may be provided on the network device. The failure recognition function 320 may include components and/or techniques configured to recognize problems, impending failure or failure of a cellular router. If the network device 300 is a cellular router, then the failure recognition function 320 may be configured for self-diagnosis. If the network device 300 is a node, such as within a mesh network of a cell of a cellular router, then the failure recognition function 320 may be configured to recognize a problem and/or failure of a cellular router by observing network characteristics, traffic, messages or the like.

If network device 300 is a cellular router (e.g., cellular router 108-112 of FIG. 1), then the failure recognition function 320 may be a self-test, self-diagnostic or the like. The failure recognition function 320 may be configured to perform diagnostics on circuitry, battery power, network connectivity, etc., to determine if the cellular router is fully functional. If the cellular router has partially failed, it may be possible for the failure recognition function 320 to recognize a problem and/or failure mode. Accordingly, the cellular router may recognize its own problem or failure, prior to that failure.

If the network device 300 is a node (e.g., nodes 114-118 of FIG. 1) then the failure recognition function 320 may be configured to detect signs or evidence of problematic and/or atypical behavior of the cellular router. Examples of such behavior may include non-responsiveness. For example, the node may notice that the requests sent to the cellular router, such as for a beacon or in related to RTS/CTS handshaking, etc., may not result in an appropriate response. Similarly, the cellular router may fail to receive and transfer data from one or more nodes, due to the problem and/or failure of the cellular router. And further, the node may compare a current behavior of the cellular router to a historical pattern of behavior for the cellular router or other cellular routers. If the information is available, the node may consider abnormal conditions at the cellular router (e.g., over temp, higher than normal humidity/resistance, etc. Thus, the failure recognition module 320 on the node attempting to transfer the data may recognize that there is a problem with the cellular router.

An input/output module 322 may be configured for packet transmission, such as of a specialized cellular router failure packet 324. Upon recognition of a problem and/or failure of the cellular router, the input/output module 322 may transmit the cellular router failure packet 324 to at least one node. The cellular router failure packet 324 may indicate that the cellular router associated with a particular cell has failed. Nodes receiving the cellular router failure packet 324 may go into a "discovery mode," wherein they attempt to find a replacement cellular router.

A randomization function 326 may be used to create random times for transmission of the cellular router failure packets 324. In an example where multiple nodes broadcast multiple copies of the cellular router failure packet 324 are broadcast by multiple nodes, the use of random times to transmit the copies reduces the collisions of the packets on channels and/or frequencies used for the broadcasts. For example, if a single control channel is used, the randomization function 326 may reduce packet collisions and assist one or more nodes to more quickly find a new cell, mesh network and/or cellular router.

Example Processes

Figure 4A:
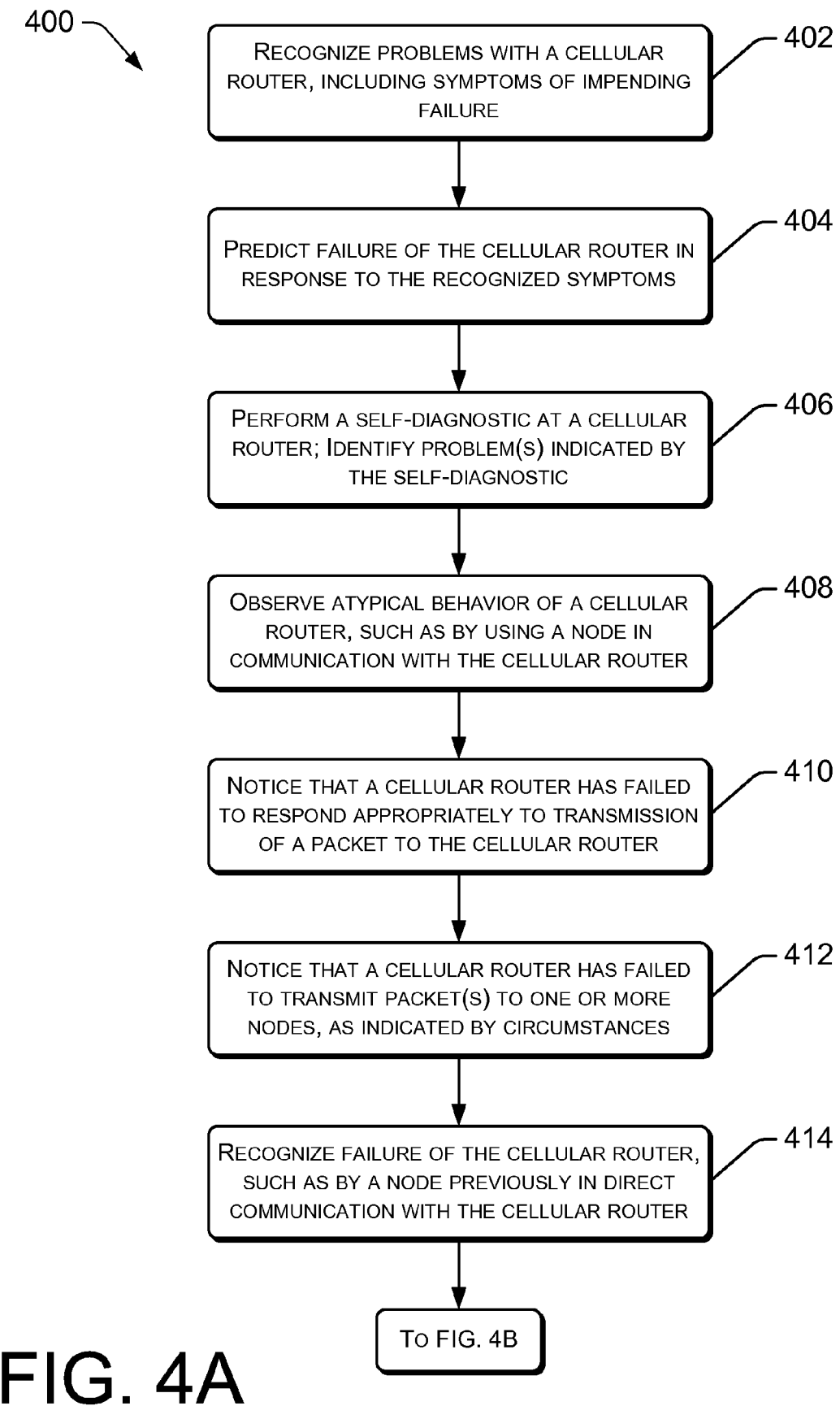
FIGS. 4A and 4B are flow diagrams illustrating an example method by which a failure of a node may be quickly advertised.
Figure 4B:
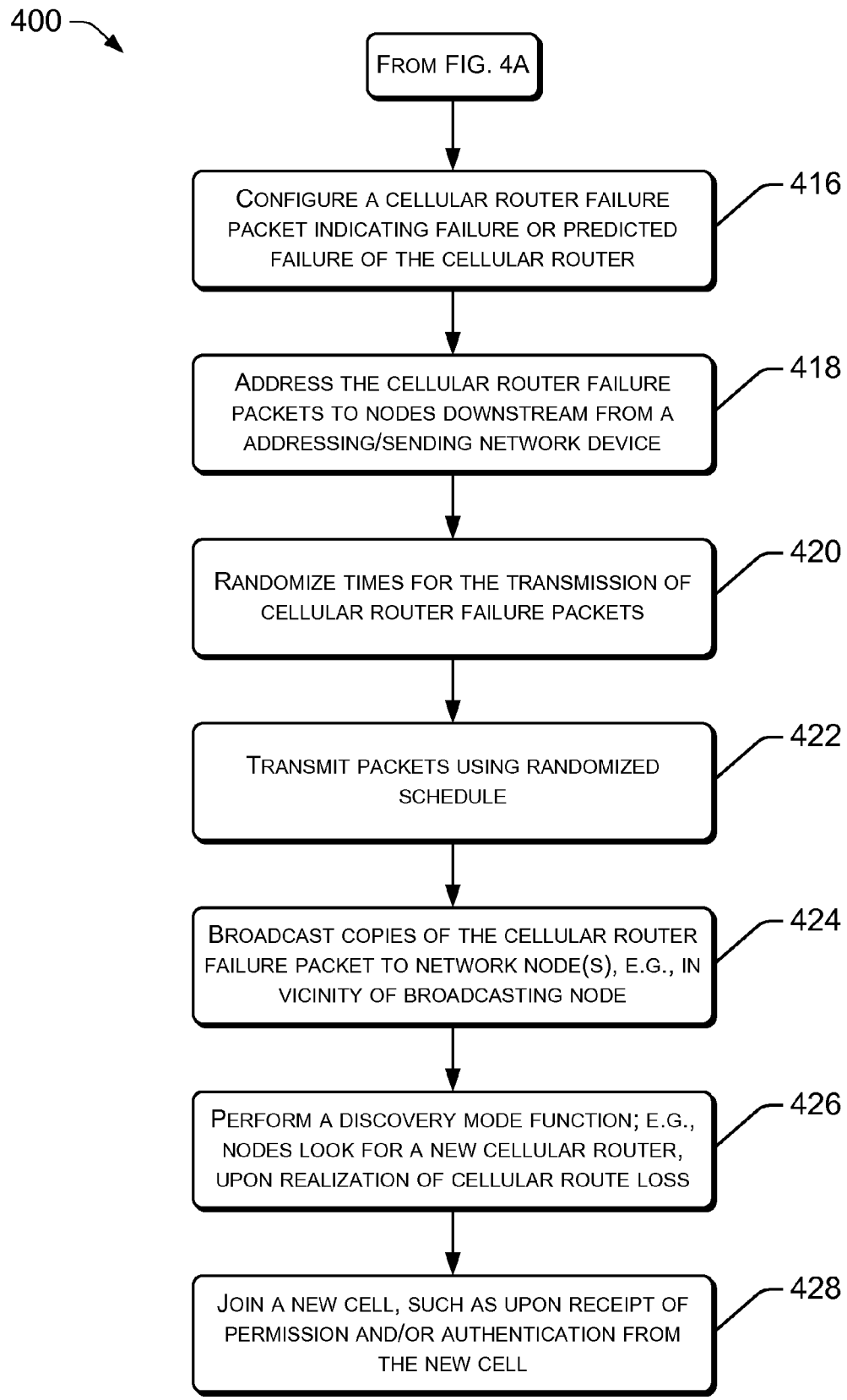

The example processes of FIGS. 4A and 4B can be understood in part by reference to the configurations of FIGS. 1-3.

However, FIGS. 4A and 4B have general applicability, and are not limited by other drawing figures and/or prior discussion.

Each process described herein is illustrated as a collection of acts, blocks or operations in a logical flow graph, which represent a sequence of operations that can be implemented in hardware, software, or a combination thereof. The processes may include storing, in a memory communicatively coupled to a processor, computer-executable instructions for performing a method, such as detecting failure of a cellular router, and then executing the instructions on the processor.

In the context of software, the operations represent computer-executable instructions stored on one or more computer-readable storage media that, when executed by one or more processors, perform the recited operations. Such storage media, processors and computer-readable instructions can be located within a system (e.g., node 300 of FIG. 3) according to a desired design or implementation. The storage media 316 seen in FIG. 3 is representative of storage media generally, both removable and non-removable, and of any technology. Thus, the recited operations represent actions, such as those described in FIGS. 4A and 4B, and are taken under control of one or more processors configured with executable instructions to perform actions indicated. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. The above discussion may apply to other processes described herein.

Computer storage media and/or memory includes volatile and non-volatile, removable and non-removable media implemented in any method or technology for storage of information such as computer readable instructions, data structures, program modules, or other data. Computer storage media includes, but is not limited to, random access memory (RAM), read only memory (ROM), electrically erasable programmable read only memory (EEPROM), flash memory or other memory technology, compact disk-read only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. Any such computer storage media may be part of the system 300. Moreover, the computer-readable media may include computer-executable instructions that, when executed by the processor(s) 314, perform various functions and/or operations described herein.

Additionally, for purposes herein, a computer readable media may include all or part of an application specific integrated circuit (ASIC) or other hardware device. Such a hardware device may be configured to include other functionality, including functions performed in synchronizing nodes in a network. Accordingly, within such an integrated circuit, one or more processors are configured with executable instructions, which may be defined by logic, transistors or other components, or on-board memory.

In contrast, communication media may embody computer-readable instructions, data structures, program modules, or other data in a modulated data signal, such as a carrier wave, or other transmission mechanism. As defined herein, computer storage media does not include communication media and/or carrier waves, data signals, or other transitory media.

Example Cellular Router Failure Advertisement

The example processes of FIGS. 4A and 4B are flow diagrams illustrating an example process 400 by which failure of a cellular router may be detected and then advertised. In one example, the process 400 may be performed by network device, such as a cellular router, a node or other device configured for operation on a network. In various examples, a node may include utility meters, such as to measure consumption of electricity, gas, water and/or sewer use. Nodes may include other network-attached and/or operated devices, such as transformers, substations, switches, valves, pumps, storage facilities, anti-theft devices and other devices having some network and/or control functionality. The process may include recognition of a cellular router problem and/or failure, followed by advertisement of that problem and/or failure to network devices (e.g., nodes) on the network. In one example, the advertisement is made to nodes in a cell defined by the failed cellular router. Additionally, advertisement to a router and/or nodes in physically adjacent cells may be helpful, as this may assist nodes associated with the failed cellular router in a "discovery mode," to discover a new cellular router.

FIG. 4A shows that at operation 402, problems with a cellular router are recognized, including symptoms of impending failure. In one example, a node may recognize symptoms of impending failure of a cellular router, including one or more instances of failure by the cellular router to send packets expected by a node, or other behavior. At operation 404, failure of the cellular router is predicted in response to recognized symptoms.

At operation 406, where a failure recognition function is operating on a cellular router, it may include a self-diagnostic test. Such a self-diagnostic may check functions including circuit integrity, network connectivity and battery availability. Problem(s) may be indicated by the self-diagnostic, which may indicate a possible failure of the cellular router.

At operation 408, where a failure recognition function is operating on a node distinct from the cellular router, such as a utility consumption meter, it may be configured to recognize atypical behavior of the cellular router. As one example, at operation 410, a node may notice that a cellular router has failed to respond appropriately to transmission of a packet to the cellular router. In the example of operation 412, the cellular router may have failed to transmit packet(s) to one or more nodes, which would be expected by circumstances. In a particular example, the cellular router may have failed to respond to any of a predetermined number of packets. The predetermined number of packets may be selected to be one or more. The predetermined number of packets to which the cellular router failed to respond may be based on historical performance, traffic on the network and other factors, singly or in combination. In the example of operation 414, packet transmission failure is particularly noticeable to nodes previously in direct communication with the cellular router, but may also be noticeable to nodes communicating with the cellular router through a chain of other nodes.

At operation 416, a cellular router failure packet is configured, indicating failure or predicted failure of the cellular router. The cellular router failure packet may be configured by the cellular router itself, if it anticipates its own failure, or by a node in the network, if it predicts or recognizes failure of the cellular router.

At operation 418, the cellular router failure packets may be addressed to nodes downstream from an addressing and/or sending network device, where downstream is travel in the direction of the root to a leaf. In this example, the network device (cellular router or node, etc.) may send cellular router failure packets downstream, i.e., from the cellular router toward leaf nodes at the edge of the cell organized around the cellular router. In a further example, the cellular router failure packets may be sent to nodes adjacent to a transmitting node.

At operation 420, the times for transmission of the cellular router failure packets are randomized. Randomized transmission times may reduce collisions of packets transmitted. At operation 422, packets may be transmitted according to the randomized schedule. Transmission according to the random schedule may be particularly important if a control channel is used, and a number of nodes are operating on that channel. In one example of the transmission of the cellular router failure packets, at operation 424, copies of the cellular router failure packet may be broadcast to network nodes, particularly using RF transmission to nodes in a vicinity of the broadcasting node.

At operation 426, a discover mode function is performed by nodes within the cell of the failed and/or failing cellular router. In the discovery mode, each node attempts to discover one or more chains or paths through other nodes that leads to a new cellular router. Thus, the nodes attempt to find a new cell to join.

At operation 428, nodes within the network receive an indication of a new cellular router. In one example, the discover mode function of operation 426 successfully finds a new cellular router for each of the nodes previously within the cell of the failed cellular router. Thus, nodes previously in a cell of the failed cellular router join a new cell with a different cellular router.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. A method of advertising a problem with a cellular router within a network, wherein the method is performed by at least one of a node or the cellular router in the network, and comprises:
   under control of one or more processors configured with executable instructions:
   recognizing symptoms of impending failure of the cellular router;
   predicting failure of the cellular router in response to the recognized symptoms;
   configuring a cellular router failure notification packet that indicates the predicted failure of the cellular router; and
   sending the cellular router failure notification packet to nodes within the network in response to the predicting of the failure of the cellular router, wherein the sending is performed at randomized times, and wherein copies of the cellular router failure notification packet are sent by a network device to nodes to assist those nodes to discover a new cellular router.

2. The method of claim 1, wherein the method is performed by the cellular router, and additionally comprises:
   performing a self-diagnostic at the cellular router;
   identifying the problem, as indicated by the self-diagnostic; and
   notifying a second cellular router in the network of the problem with the cellular router.

3. The method of claim 1, wherein configuring the cellular router failure notification packet comprises:
   addressing the cellular router failure notification packet to a node downstream from the network device addressing the cellular failure notification packet.

4. The method of claim 1, wherein the method is performed by the node in the network, and additionally comprises:
   noticing that the cellular router has failed to respond appropriately to transmission of a packet to the cellular router.

5. The method of claim 1, wherein the method is performed by the node in the network and additionally comprises:
   performing a discovery mode function, including looking for the new cellular router in response to the cellular router failure notification packet.

6. The method of claim 1, wherein the method is performed by a node in the network and recognizing the symptoms of impending failure of the cellular router comprises:
   recognizing atypical behavior by the cellular router.

7. The method of claim 1, wherein sending the cellular router failure notification packet comprises:
   sending a plurality of cellular router failure notification packets at the randomized times to a plurality of downstream nodes.

8. The method of claim 1, wherein the method is performed by the node in the network, and additionally comprises:
   noticing that the cellular router has failed to respond appropriately; and
   looking for a new cell or the new cellular router in response to the failure to respond appropriately.

9. A method of advertising a failure of a network device within a network, comprising:
   under control of one or more processors configured with executable instructions:
   recognizing symptoms of impending failure of the network device;
   predicting failure of the network device in response to the recognized symptoms;
   configuring a failure notification packet indicating the predicted failure of the network device; and
   sending the failure notification packet to at least one node within the network, wherein sending the failure notification packet comprises:
   randomizing times for packet transmission; and
   sending a plurality of failure notification packets according to the randomized times, wherein copies of the failure notification packet are sent by the network device to nodes to assist those nodes to discover a new cellular router.

10. The method of claim 9, wherein the method is performed by a node in the network, and the symptoms of impending failure of the network device are recognized by the node, and include one or more failures by the network device to transmit packets expected by the node.

11. The method of claim 9, wherein the failure of the network device is a failure of a cellular router, and the symptoms of impending failure are recognized by the cellular router while performing a self-diagnostic.

12. The method of claim 9, additionally comprising:
   recognizing the failure of the network device, the recognizing performed by a node previously in direct communication with the network device; and broadcasting copies of the failure notification packet to nodes within a vicinity of the node previously in direct communication with the network device.

13. The method of claim 9, additionally comprising:
performing a discovery mode function in a node in a cell of the network, wherein the discovery mode function comprises looking for the new cellular router.

14. The method of claim 9, wherein the method is performed by the network device.

15. A network device, comprising:
a processor;
a memory, in communication with the processor;
a failure recognition function, defined in the memory and executable by the processor and configured to operate a self-test of the network device, to recognize symptoms of an impending failure of the network device and to predict failure of the network device response to the recognized symptoms;
a failure notification packet, defined in the memory and configured to indicate the predicted failure of the network device; and
an input/output function, configured to send the failure notification packet in response to an indication of a problem from the failure recognition function, wherein the input/output function is additionally configured for:
randomizing times for packet transmission; and
sending a plurality of failure notification packets according to the randomized times.

16. The network device of claim 15, wherein the input/output function is configured for:
broadcasting copies of the failure notification packet to nodes previously in direct communication with the network device.

17. The network device of claim 15, wherein the network device is a cellular router, and the failure recognition function is configured for:
operating a self-test of the cellular router and recognizing a problem.

18. The network device of claim 15, wherein the input/output function is additionally configured for:
broadcasting copies of the failure notification packet to nodes within a vicinity of the network device.

* * * * *